United States Patent
Fol et al.

(10) Patent No.: US 8,167,248 B2
(45) Date of Patent: May 1, 2012

(54) AIRCRAFT COMPRISING A DEVICE FOR REDUCING THE INDUCED DRAG

(75) Inventors: Thierry Fol, Grenade (FR); Marjorie Defos, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 652 days.

(21) Appl. No.: 12/299,621

(22) PCT Filed: May 11, 2007

(86) PCT No.: PCT/FR2007/000806
§ 371 (c)(1),
(2), (4) Date: Nov. 5, 2008

(87) PCT Pub. No.: WO2007/135270
PCT Pub. Date: Nov. 29, 2007

(65) Prior Publication Data
US 2010/0059624 A1 Mar. 11, 2010

(30) Foreign Application Priority Data
May 23, 2006 (FR) ................................ 06 04629

(51) Int. Cl.
*B64C 23/00* (2006.01)
*B64C 21/04* (2006.01)
(52) U.S. Cl. .......... 244/198; 244/207; 244/55; 244/130
(58) Field of Classification Search ............. 244/198, 244/199.4, 207–209, 91, 54, 55, 130
See application file for complete search history.

(56) References Cited

U.S. PATENT DOCUMENTS

| | | | | |
|---|---|---|---|---|
| 3,744,745 | A * | 7/1973 | Kerker et al. | 244/199.1 |
| 3,920,203 | A * | 11/1975 | Moorehead | 244/207 |
| 3,968,946 | A * | 7/1976 | Cole | 244/214 |
| 4,019,696 | A | 4/1977 | Hirt et al. | |
| 4,314,681 | A | 2/1982 | Kutney | |
| 4,466,587 | A | 8/1984 | Dusa et al. | |
| 4,540,143 | A * | 9/1985 | Wang et al. | 244/130 |
| 4,643,376 | A | 2/1987 | Vanderhoeven | |
| 4,685,643 | A * | 8/1987 | Henderson et al. | 244/199.1 |
| 4,884,772 | A * | 12/1989 | Kraft | 244/199.1 |
| 5,443,230 | A | 8/1995 | Lord et al. | |
| 6,116,015 | A | 9/2000 | Taylor et al. | |
| 6,964,397 | B2 * | 11/2005 | Konings | 244/199.1 |
| 2005/0011993 | A1 | 1/2005 | Konings | |
| 2005/0274846 | A1 * | 12/2005 | Dun | 244/55 |
| 2008/0006738 | A1 * | 1/2008 | Childress et al. | 244/54 |
| 2009/0230251 | A1 * | 9/2009 | Bonnaud et al. | 244/198 |

FOREIGN PATENT DOCUMENTS
GB  2 112 077  7/1983

OTHER PUBLICATIONS

U.S. Appl. No. 12/092,614, filed Sep. 4, 2008, Fol, et al.

* cited by examiner

*Primary Examiner* — Tien Dinh
*Assistant Examiner* — Joseph W Sanderson
(74) *Attorney, Agent, or Firm* — Oblon, Spivak, McClelland, Maier & Neustadt, L.L.P.

(57) ABSTRACT

An aircraft including a longitudinal fuselage, at least two lateral wings connected symmetrically one on each side of the fuselage and at least one engine pod fixed to each lateral wing via an engine support pylon. At least one profiled bearing rod is positioned on each of the engine support pylons so as to generate a propulsive resultant force under action of an oblique air flow.

8 Claims, 2 Drawing Sheets

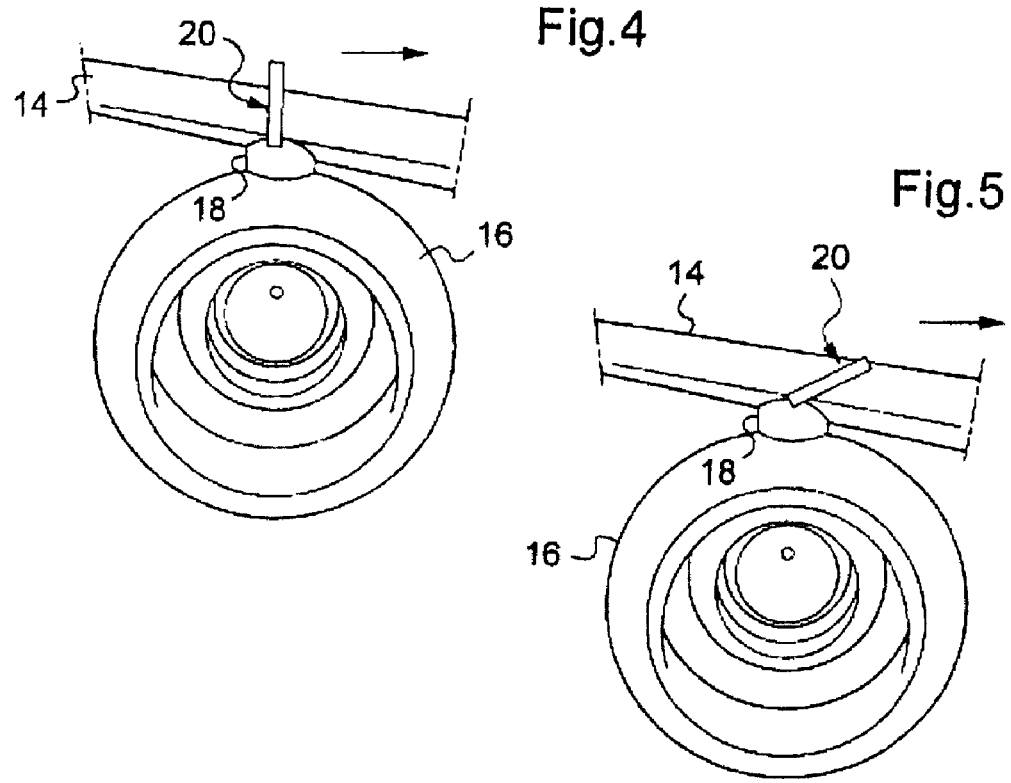
Fig.4
Fig.5
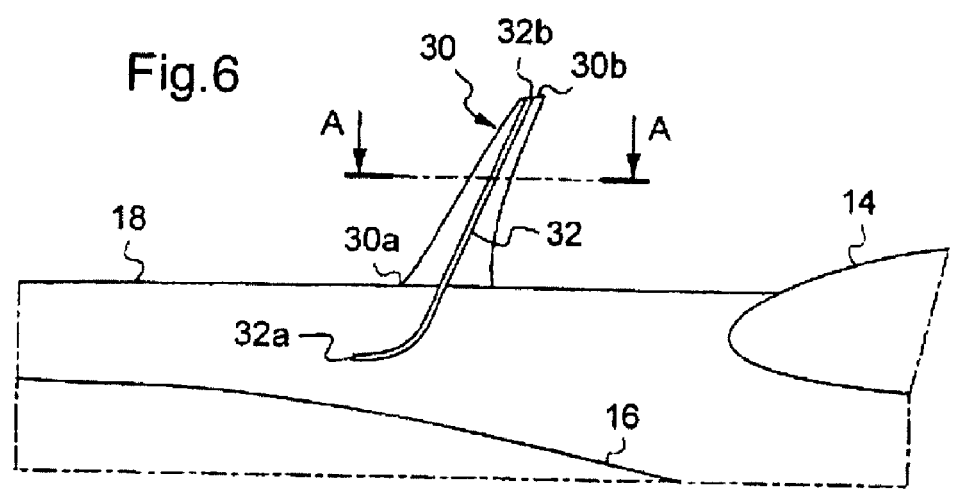
Fig.6
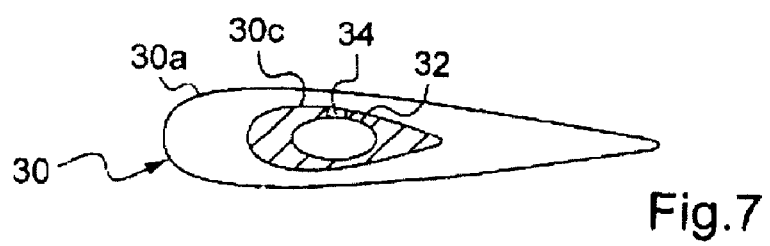
Fig.7

AIRCRAFT COMPRISING A DEVICE FOR REDUCING THE INDUCED DRAG

The invention relates to a device making it possible to reduce the aerodynamic drag of an aircraft.

For various reasons, especially to achieve fuel savings, there is an ongoing effort to reduce the aerodynamic drag on aircraft during cruising flight.

The main objective of the present invention is precisely to reduce the aerodynamic drag of an aircraft.

To this end, the invention relates to an aircraft equipped with a longitudinal fuselage, at least two side wings connected symmetrically to opposite sides of the fuselage and at least one engine nacelle fixed to each side wing by way of an engine support pylon.

According to the invention, at least one profiled lifting member is disposed on each of the engine support pylons, in such a way as to generate a propulsive resultant force under the action of an oblique air flow.

This member is subjected to a high-intensity local air flow created by the interaction of the fuselage and of the main wing unit with the longitudinal air flow upstream from the aircraft. The direction of this flow is not aligned with the longitudinal general direction of the air flow upstream from the aircraft, but is oriented obliquely relative thereto. The lifting force that develops on this member is oriented perpendicular to the oblique local flow direction. This lifting force is oriented to a major extent in the direction of the tip of the main wing unit and to a minor extent toward the front of the aircraft. Such a force projected onto the line of flight of the aircraft induces a resultant force of propulsion.

It will be noted that local drag forces are generated by the member.

However, the contribution of these local forces to the resultant drag of the aircraft is largely compensated by the resultant force of propulsion induced by the projection of the lift of the member onto the axis of the resultant drag of the aircraft.

According to one characteristic, the said at least one member extends from an end fixed to the engine support pylon, departing from the said end in an extension direction inclined by at least 30° relative to the top surface of the side wing in question.

The inclination of the extension direction of the member is not necessarily vertical)(90°, but it must not be too close to horizontal, because then the member can no longer use the air flow that is oblique relative to the longitudinal direction of the air flow to generate a lifting force.

According to one characteristic, the said at least one member is disposed on or close to the crest line of the engine support pylon.

By disposing the member in this manner, it can recover part of the energy contained in the transverse air flow.

According to one characteristic, the said at least one member is disposed along the longitudinal direction of the engine support pylon at a distance, from the part of the pylon fixed to the side wing, of between 10% and 70% of the local chord of the wing unit.

By disposing the member at such a distance from the wing unit, the member is then able to recover the energy of oblique flows. In fact, if the member were placed too close to the wing unit, a detrimental interaction with the flow of the leading edge of the wing unit would be produced.

According to one characteristic, the said at least one member possesses a wetted area and an extension dimension or height, measured from one end of the said member fixed to the engine support pylon, the wetted area and the height being in an area-to-height ratio of between 1 and 4.

In fact, an excessively large wetted area of the member would generate very satisfactory lifting force but too much inherent drag.

It will be noted that by increasing the height of the member, for constant area, the inherent drag generated by the said member is reduced.

Thus, by appropriately adapting the area and height of the member, there is achieved a good compromise between the obtained lifting force, which one wishes to favor, and the inherent drag generated by the member, which one seeks to minimize.

According to one characteristic, the said at least one member possesses a wetted area that is adjusted as a function of the gain in desired drag reduction and of the general dimensions of the aircraft.

According to another characteristic, the said at least one member possesses an end said to be free opposite an end fixed to the engine support pylon, the free end being oriented toward downstream relative to the upstream position of the fixed end, thus conferring on the member an inclination toward downstream in longitudinal direction.

It will be noted that, for aircraft speeds on the order of Mach 0.4 or Mach 0.5, the free end of the member may be disposed substantially vertically in the end of the member which is fixed to the support pylon. Nevertheless, when the aircraft is flying at transonic speeds, it is preferable to incline the free end of the member toward downstream in order to limit supersonic phenomena.

In this way the drag generated by the member at transonic speeds is limited.

According to one characteristic, the said at least one member has the shape of a fin, which imparts an aerodynamic profile to the member.

According to one characteristic, the said at least one member is provided with a wall defining an internal duct for evacuation of a fluid flow, the said duct communicating, at one end, with the interior of the engine support pylon from which the fluid flow originates and, at a distance from that end, with at least one aperture implemented in the wall of the member and discharging to the outside of the said member.

Such an arrangement makes it possible, for example, to drain, by way of the member, an air flow internal to the reactor support pylon toward the outside of the latter.

Other characteristics and advantages will become apparent in the course of the description hereinafter, given only by way of non-limitative example, written with reference to the attached drawings, wherein:

FIG. 4 is a schematic front view of the member of FIGS. 1 and 2;

FIG. 5 is an alternative embodiment showing the member of FIG. 4 in a different angular orientation;

FIGS. 6 and 7 are schematic views of the member according to an alternative embodiment showing an internal duct for evacuation of flow, and apertures.

Figure 1:
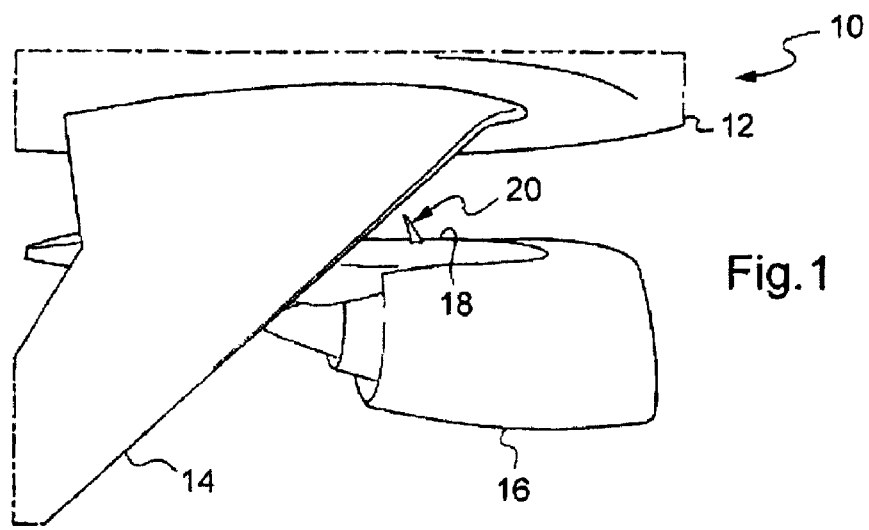
FIG. 1 is a schematic general view in perspective showing the installation of a lifting member according to the invention relative to the fuselage and to the wing unit of an aircraft.

As represented in FIG. 1 and designated by the general reference 10, an aircraft 10 is equipped with a fuselage 12, to which are joined two side wings, disposed symmetrically on opposite sides of the fuselage.

Only one of the side wings 14 is represented in FIG. 1.

An engine nacelle 16 is fixed to wing 14 by way of an engine support pylon 18.

Support pylon 18 is itself fixed under wing 14 in traditional manner, which is not represented and will not be described in further detail here.

The aforesaid arrangement composed of engine nacelle 16 and support pylon 18 is also provided in identical manner on the other side wing not represented in this figure.

It will be noted that, depending on the type of aircraft, a plurality of such arrangements may be provided on each side wing.

Figure 2:
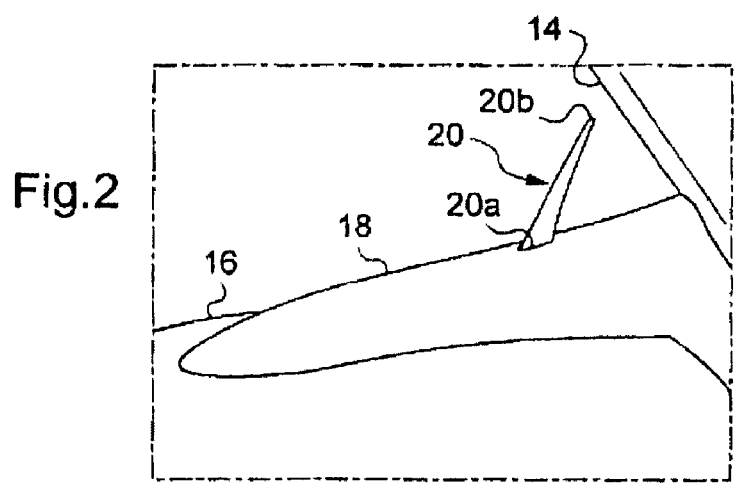
FIG. 2 is an enlarged schematic view in perspective of the member of FIG. 1, seen from the aircraft fuselage.

As represented in FIGS. 1 and 2, a lifting member 20 is disposed on engine support pylon 18.

This member is profiled, for example in the manner of a wing unit of small size, in order to avoid generating too much inherent drag.

In the example represented in FIGS. 1 and 2, member 20 has the shape of a fin.

The shape of this lifting member is effectively similar to that of a wing of an airplane that would fly at the local mean speed of the location at which the lifting member is installed on pylon 18.

Figure 3:
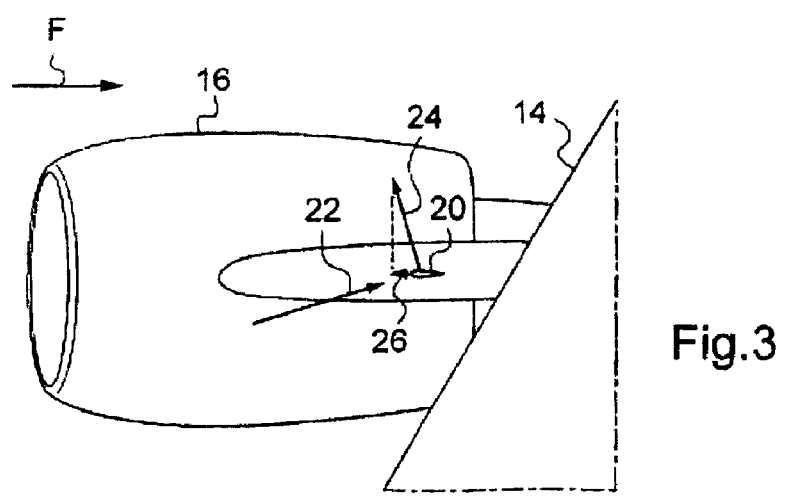
FIG. 3 is an enlarged schematic view from above of the member of FIG. 2 and of the forces involved.

As represented in FIG. 3, when the aircraft is in cruising flight, the total air flow that the aircraft encounters has a longitudinal direction F. Upon contact of the aircraft with this flow, there are formed local flows that are oblique, or in other words non-longitudinal, and that contribute to reducing the total drag of the aircraft by virtue of the invention.

In FIG. 3, the arrow denoted by 22 represents the direction of one of these oblique flows, also known as cross flows.

When this oblique local flow encounters lifting member 20, an aerodynamic force 24 is developed by the said member, perpendicular to the direction of the oblique local flow.

This lifting force has a significant longitudinal component 26, which represents a resultant force of propulsion that contributes to reducing the total aerodynamic drag of the aircraft.

Although the encounter between the oblique local flow and lifting member 20 also generates local drag forces inherent to this member (these parasitic forces are not represented in the figure), they are largely compensated by the longitudinal component of the generated resultant force 24 of propulsion.

Furthermore, as will be seen hereinafter, these local drag forces can be reduced.

As represented in FIGS. 1 and 2, lifting member 20 is disposed longitudinally along the crest of reactor support pylon 18 at a distance, on the one hand, from the part of the pylon fixed to wing unit 14 and, on the other hand, from the part of the pylon fixed to nacelle 16.

More particularly, the member is disposed upstream from the leading edge of the wing unit, at a distance of between 10% and 70% of the chord of the wing unit.

It is important, in fact, that the member not be too close to the wing unit, to ensure that its interactions with the leading edge are not detrimental.

Furthermore, an arrangement of lifting member 20 too close to the part of support pylon 18 joined to nacelle 16, it would entail the risk of no longer benefiting from sufficiently intense oblique flows.

For example, member 20 is positioned on the engine support pylon at the location where the side slip, or in other words the difference between the local oblique flow and the flow upstream from the airplane (longitudinal flow), is maximal.

More particularly, lifting member 20 has two opposite ends, an end 20a, serving as the base, which is fixed to the engine support pylon (FIG. 2), and a free end 20b at a distance from the said base end.

The member therefore extends in an extension direction, also known as height, which, in the example represented in FIG. 4 (front view of the nacelle; the arrow indicates the direction of the fuselage), is substantially perpendicular to the substantially horizontal top surface (extrados) of wing unit 14.

It will be noted, nevertheless, that the extension direction of lifting member 20, represented in a vertical position in FIGS. 1 and 2, may be inclined relative to the top surface of the wing unit by an angle of inclination that is not necessarily equal to 90° but is at least equal to 30°.

An angle of inclination of less than 90° is represented in FIG. 5 (front view of the nacelle; the arrow indicates the direction of the fuselage).

In fact, such an angle of inclination of the member makes it even more possible for this member to generate sufficient lifting force to reduce the total aerodynamic drag of the aircraft significantly when the member encounters a local oblique flow.

It also should be noted that the lifting member may adopt such an inclination when it is fixed on the crest line of reactor support pylon 18 and also when it is disposed close to this crest line.

It will be noted that the wetted area of lifting member 20 is adjusted as a function of the desired gain in reduction of the aerodynamic drag of the airplane and also of the general dimensions of the aircraft.

In proportioning the lifting member, it is sought to create the maximum lift with the minimum area, in order that the lifting member will not generate too much inherent drag.

It will be noted that the rules for imparting twist and camber to the profiles constituting the lifting member are determined as a function of the evolution, along the leading edge of the lifting member, on the one hand of the side slip measured in the global aerodynamic coordinate system of the airplane, and on the other hand of the desired aerodynamic load on this member.

More particularly, the profile of each transverse section of the member, taken perpendicular to the height thereof, is defined as a function of the local oblique flow.

It will be noted that the proportioning of the member undergoes an adjustment of the dimension of extension or height of the member and of its wetted area.

Thus the ratio between the external area of the member and its height is generally between 1 and 4 (this value depends on the general dimensions of the airplane) in order to obtain a good compromise between the lifting force, generated when the local oblique flow encounters the member and which must be maximal, and the induced local inherent drag, which is sought to be reduced.

By way of example, the wetted area is 4 m$^2$ and the height of the member is 1 m, thus giving a ratio of 4.

Furthermore, in order to obtain the best possible lifting force for member 20, the angular position of the member is adjusted by rotation around a vertical axis, along which its height is defined.

In this way the member is adjusted relative to an axis that is globally perpendicular to the profiles constituting the member, meaning that the position of the latter is regulated relative to an oblique local flow in order that one of the lifting surfaces of the member will be impinged on optimally by the flow.

In this way it is possible to obtain the maximum aerodynamic efficiency, or in other words the maximum ratio between lift and drag.

It should be noted that, depending on the pressure field that develops over the member, or in other words as a function of the characteristics of the flow enveloping the airplane, the presence of the said member may improve the flow of air over the wing unit.

Under certain circumstances, the compression effects induced downstream from the trailing edge of the lifting member in fact may be used to retard the compressibility of the main wing unit.

Thus the profiles of the wing unit that are situated downstream from the lifting member are subjected to speeds lower than those that would exist in the absence of the member.

As represented in the exemplary embodiment of FIGS. 1 and 2, free end 20b of the member is not necessarily placed vertically in end 20a. End 20b in fact can be displaced in longitudinal direction (fuselage axis), toward downstream, such that it is located downstream relative to the upstream position of end 20a fixed to engine support pylon 18.

Thus member 20 has an inclination toward downstream, which is particularly useful to it in limiting the inherent local drag generated by the member at transonic speeds, or in other words at local Mach numbers higher than 0.6.

As represented in FIG. 6 (partial view in section of the pylon in its environment), member 30 in one alternative embodiment has an internal duct 32 defining a passage for an air flow originating in the interior of engine support pylon 18.

More particularly, the internal flow of support pylon 18 originates, for example, from the cold port of an internal air-conditioning system of the engine.

In this way the presence of member 30 is beneficial as regards evacuating this flow originating from the pylon.

More particularly, member 30 is provided with a wall whose external surface defines the external shape of the member and whose internal surface defines the internal duct for evacuating fluid flow.

As represented in FIG. 6, this duct communicates at one end 32a with the internal part of engine support pylon 18 and, by means of its opposite end 32b, extends into pylon 18 and along the member in the direction of free end 30b thereof.

One or more discharge apertures, such as aperture 34 in enlarged section A-A of FIG. 7, are implemented in the wall of the member at one or more locations thereof, in order to permit the flow circulating in the duct to be evacuated toward the outside.

In FIG. 7, profile 30c of the wall of the lifting member has been represented in cross section, as has the profile of this wall at the base of the member, which base coincides with its end 30a.

It will be noted that the apertures can be implemented in regular or irregular manner along the wall of the member.

They are arranged on that face of the member which is opposite to the face receiving the oblique flow (face turned upward in FIG. 3).

Alternatively, the aperture or apertures may be arranged at or close to free end 30b of the member.

End 32b of the duct itself constitutes an aperture.

It will be noted that the apertures have a passage cross section of between 0.1 and 2 dm$^2$, depending on the aircraft.

It will also be noted that the two possibilities may be combined, namely apertures implemented along the wall of the member and this as far as the free end thereof.

The invention claimed is:

1. An aircraft comprising:
   a longitudinal fuselage;
   at least two side wings connected symmetrically to opposite sides of the fuselage;
   at least one engine nacelle fixed to each side wing by an engine support pylon; and
   at least one profiled lifting member disposed on each of the engine support pylons along a crestline of each of the engine support pylons, and a base of the at least one profiled lifting member attached to a top surface of the engine support pylons, so as to generate a propulsive resultant force under action of an oblique air flow.

2. An aircraft according to claim 1, wherein the at least one profiled lifting member extends from an end fixed to the engine support pylon, departing from the end in an extension direction inclined by at least 30° relative to the top surface of the side wing in question.

3. An aircraft according to claim 1, wherein the at least one profiled lifting member is disposed along the longitudinal direction of the engine support pylon at a distance, from a part of the pylon fixed to the side wing, of between 10% and 70% of a local chord of the wing.

4. An aircraft according to claim 1, wherein the at least one profiled lifting member includes a wetted area and an extension dimension or height, measured from one end of the member fixed to the engine support pylon, the wetted area and the height being in an area-to-height ratio of between 1 and 4.

5. An aircraft according to claim 1, wherein the at least one profiled lifting member includes a wetted area that is adjusted as a function of gain in desired drag reduction and of general dimensions of the aircraft.

6. An aircraft according to claim 1, wherein the at least one profiled lifting member includes a free end opposite an end fixed to the engine support pylon, the free end being oriented toward downstream relative to an upstream position of the fixed end, thus conferring on the member an inclination toward downstream in a longitudinal direction.

7. An aircraft according to claim 1, wherein the at least one profiled lifting member has a shape of a fin.

8. An aircraft according to claim 1, wherein the at least one profiled lifting member includes a wall defining an internal duct for evacuation of a fluid flow, the duct communicating, at one end, with an interior of the engine support pylon from which the fluid flow originates and, at a distance from that end, with at least one aperture implemented in the wall of the member and discharging to the outside of the member.

* * * * *